United States Patent
Isaacson

(10) Patent No.: US 6,802,565 B2
(45) Date of Patent: Oct. 12, 2004

(54) HEAD RESTRAINT ASSEMBLY FOR MOTOR VEHICLE

(75) Inventor: Troy Allen Isaacson, Wixom, MI (US)

(73) Assignee: Centura Group, Inc., Northville, MI (US)

( * ) Notice: Subject to any disclaimer, the term of this patent is extended or adjusted under 35 U.S.C. 154(b) by 59 days.

(21) Appl. No.: 10/157,271

(22) Filed: May 29, 2002

(65) Prior Publication Data

US 2003/0222491 A1 Dec. 4, 2003

(51) Int. Cl.⁷ .................................................. A47C 1/10
(52) U.S. Cl. ....................................................... 297/410
(58) Field of Search ......................................... 297/410

(56) References Cited

U.S. PATENT DOCUMENTS

| | | | |
|---|---|---|---|
| 3,062,157 A | | 11/1962 | Woods |
| 3,563,603 A | | 2/1971 | D'Aprile |
| 3,635,527 A | | 1/1972 | Weber |
| 4,483,565 A | * | 11/1984 | Terui et al. ................. 297/410 |
| 4,489,979 A | | 12/1984 | Zyngier |
| 4,577,904 A | * | 3/1986 | Wiese et al. ................. 297/410 |
| 4,604,777 A | * | 8/1986 | Meeks ......................... 24/665 |
| 4,636,107 A | * | 1/1987 | Casler et al. ............... 411/477 |
| 4,639,041 A | | 1/1987 | Furukawa |
| 4,650,250 A | | 3/1987 | Krugener et al. |
| 4,657,297 A | | 4/1987 | Ishibashi |
| 4,657,425 A | * | 4/1987 | Takahashi ................... 403/104 |
| 4,854,642 A | | 8/1989 | Vidwans et al. |
| 4,976,493 A | | 12/1990 | Frankila |
| 5,056,867 A | * | 10/1991 | Foster et al. ................ 297/410 |
| 5,080,437 A | * | 1/1992 | Pesta et al. ................. 297/410 |
| 5,156,440 A | * | 10/1992 | Vidwans ..................... 297/410 |
| 5,590,929 A | | 1/1997 | Hamelin |
| 5,667,276 A | * | 9/1997 | Connelly et al. ........... 297/410 |
| 5,823,623 A | * | 10/1998 | Beck .......................... 297/410 |
| 5,860,703 A | * | 1/1999 | Courtois et al. ............ 297/410 |
| 5,934,755 A | * | 8/1999 | Halamish .................... 297/410 |
| 5,945,952 A | | 8/1999 | Davidson |
| 6,012,777 A | * | 1/2000 | Wege et al. ................ 297/410 |
| 6,062,645 A | * | 5/2000 | Russell ....................... 297/410 |
| 6,099,077 A | * | 8/2000 | Isaacson ..................... 297/410 |
| 6,554,526 B1 | * | 4/2003 | Egelandsdal ................ 403/294 |

FOREIGN PATENT DOCUMENTS

| | | | |
|---|---|---|---|
| AU | 167192 | 4/1954 | |
| DE | 24 26 728 | 12/1975 | |
| DE | 22 00 282 | 2/1979 | |
| FR | 2458-422 | 2/1981 | |
| GB | 2 064 312 A | 6/1981 | |
| GB | 2 069 584 A | 8/1981 | |
| JP | 05329033 A | * 12/1993 | ............ A47C/7/38 |
| JP | 6-262968 | 9/1994 | |
| SU | 1132-135 A | 1/1985 | |

* cited by examiner

*Primary Examiner*—Peter M. Cuomo
*Assistant Examiner*—Stephanie Harris
(74) *Attorney, Agent, or Firm*—Brooks Kushman P.C.

(57) ABSTRACT

A head restraint assembly (16) comprising at least one post (20) having at least one retainer notch (52) and a tubular bushing (22) having a head (26) with a socket (32) and a bore (24) having longitudinal ribs (71) and sized to receive the at least one post (20). A button subassembly (38) which is insertable into the socket (32) is also provided. The button subassembly (38) is movable within the socket (32) such that an tongue (48) is movable in and out of alignment with an associated retainer notch (52) to allow the at least one post (20) to move. A method of attaching a head restraint assembly having a head restraint pad to a seat back is also disclosed.

12 Claims, 3 Drawing Sheets

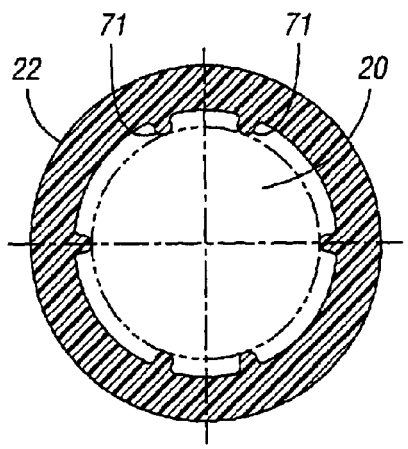
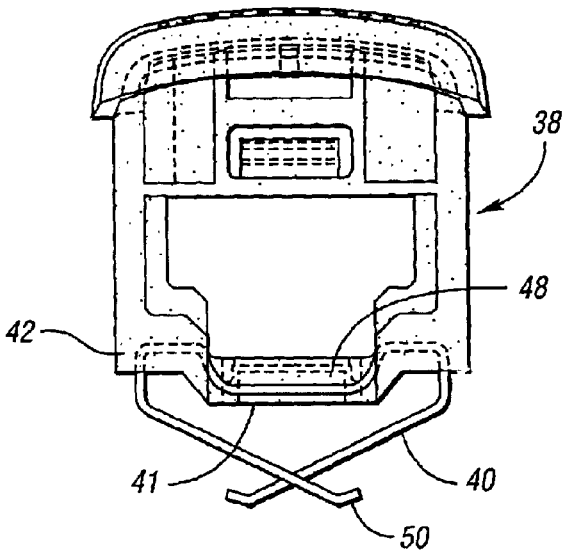
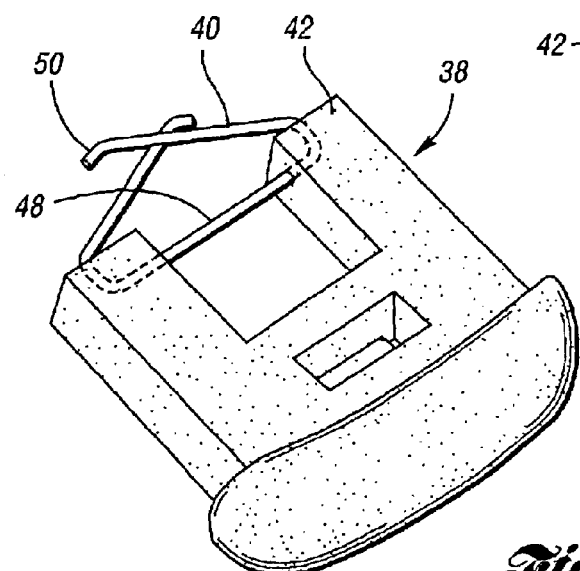
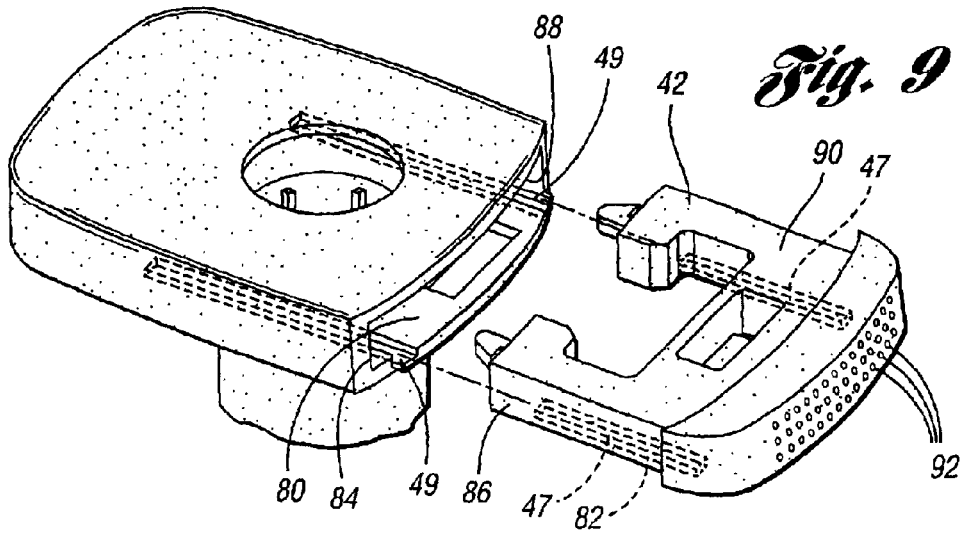

HEAD RESTRAINT ASSEMBLY FOR MOTOR VEHICLE

BACKGROUND OF THE INVENTION

1. Field of the Invention

The present invention relates to a head restraint assembly for motor vehicle seats for enabling a head restraint pad to be moved with respect to a motor vehicle seat.

2. Background Art

Motor vehicle seats typically include a head restraint pad mounted to the seat for comfort and safety of the passenger. The head restraint pad is mounted on one or two posts which are inserted into guide sleeves affixed to the seat. The posts typically include retainer notches which allow the head restraint pad to be vertically adjustable.

U.S. Pat. No. 4,854,642 to Hoover Universal, Inc., discloses a head restraint guide assembly having a bushing member installed within the seat back for receiving the head restraint pad posts. The head restraint bushing includes extending legs with ramp surfaces so that when the bushing is inserted within the seat back the legs are resiliently deflected and become locked into place when the installed position is reached. The head restraint post passes through the bushing and has a number of notches which provide detents. A detent lug carried by the bushing engages the detent notches and is resiliently biased against the post. The detent notches are provided with cam surfaces, enabling the head restraint to be raised and lowered to and past the detent positions. The lowermost notch forms a retainer notch with a radial wall which prevents complete removal of the head restraint. A leaf spring actuator is used which can be depressed from outside of the seat back and acts on the detent lug to deflect it out of engagement with the detent notches, thereby enabling withdrawal of the head restraint assembly.

In order to remove the head restraint post, a downward force must be applied to the actuator by a tool such as a screwdriver, causing the lug to move out of engagement with the retainer notch. Additionally, once the bushing member is inserted into the seat, it is not removable.

The invention disclosed in U.S. Pat. No. 6,099,077, issued to Isaacson and assigned to Centura Group, Inc., solves many of those problems. The present invention offers further improvements in the function and manufacture of a head restraint assembly.

SUMMARY OF THE INVENTION

According to the present invention, an improved head restraint assembly is provided for enabling a head restraint pad to be moved with respect to a motor vehicle seat. The head restraint pad includes at least one post connected to and supporting the head restraint pad, and having at least one retainer notch for vertically adjusting the height of the head restraint pad.

In one aspect of the invention, a head restraint assembly, enabling a head restraint pad to be moved with respect to a motor vehicle seat back, is provided. The assembly has at least one post connected to and supporting the head restraint pad to permit the pad to be moved inwardly and outwardly in relation to the seat back. The at least one post has at least one retainer notch on the exterior surface of the at least one post. A tubular bushing is mounted to the seat and has an inside bore sized for receiving the at least one post. The inside bore has at least one longitudinal rib therein to guide the post so as to facilitate ready insertion thereof during manufacturing processes and inwardly and outwardly movement during operational use. The tubular bushing has a head outside the seat and the head has a socket with an open outside end. A button subassembly insertable into the open outside end of the socket is also provided. The button subassembly has an insertable end that inserts into the open outside end of the socket, an actuator portion located at the opposite end of the button subassembly from the insertable end which remains outside of the socket when the button subassembly is installed, and a central portion inserted into the socket through which the at least one post extends. The button subassembly further includes a spring located proximate the insertable end. The actuator portion is movable with respect to the head after the button subassembly is inserted into the socket. The button subassembly comprises a tongue adapted to cooperate with an associated retainer notch provided on the at least one post when the at least one post is moving inwardly or outwardly. The tongue is movable out of alignment with the associated retainer notch when the actuator portion is moved so that the head restraint pad may be moved with respect to the motor vehicle seat.

According to another embodiment of the present invention, the head restraint assembly comprises a pair of locking members, each having an undercut and wherein the spring comprises a pair of openings sized to engage the locking members. The spring is removably attached to the button subassembly by being installed over the locking members and constrained in the undercuts.

According to yet another embodiment of the present invention, one of the socket or the button subassembly has a flange.

According to yet another embodiment of the present invention, one of the socket or the button subassembly has a flange and the other of the socket or button subassembly has a groove sized to receive the flange.

According to a further embodiment of the present invention, the head has a bottom surface having an opening therein and the button subassembly has a flexible locking rib wherein the locking rib extends through the opening of the bottom surface of the head to selectively lock the button subassembly in the head.

According to a further embodiment of the present invention, the spring is integrally molded to the insertable end of the button subassembly.

Another aspect of the present invention provides a head restraint assembly enabling a head restraint pad to be moved with respect to a motor vehicle seat back. The assembly comprises at least one post connected to and supporting the head restraint pad to permit the pad to be moved inwardly and outwardly in relation to the seat back. The at least one post has at least one retainer notch on the exterior surface of the at least one post. A tubular bushing is mounted to the seat and has an inside bore sized for receiving the at least one post. The tubular bushing has a head outside the seat and the head has a socket with an open outside end. The invention provides a button subassembly insertable into the open outside end of the socket. The button subassembly has an insertable end that inserts into the open outside end socket, an actuator portion at the opposite end of the button subassembly from the insertable end which remains outside of the socket when the button subassembly is installed, and a central portion inserted into the socket through which the at least one post extends. The button subassembly further includes a spring located proximate the insertable end. The actuator portion is movable with respect to the head after the button subassembly is inserted into the socket. The button subassembly comprises a tongue adapted to cooperate with an associated retainer notch provided on the at least one post when the at least one post is moving inwardly or outwardly. The tongue is movable out of alignment with the associated retainer notch when the actuator portion is moved so that the head restraint pad may be moved with respect to the motor vehicle seat. The socket or the button subassembly has a flange.

In another embodiment of the present invention, the other of the socket or the button subassembly has a groove sized to receive the flange.

In an alternative embodiment of the present invention, the spring in integrally molded to the insertable end of the button subassembly.

According to another alternative embodiment of the present invention, the head restraint assembly comprises a pair of locking members each having an undercut and wherein the spring comprises a pair of openings sized to fit over the locking members. The spring is removably attached to the button subassembly by being installed over the locking members and constrained in the undercuts.

Yet another aspect of the present invention provides a method of attaching a head restraint assembly having a head restraint pad to a seat back. The method comprises attaching at least one post to the head restraint pad for supporting the head restraint pad and to permit the pad to be moved inwardly and outwardly in relation to the seat back. The at least one post has at least one retainer notch on the exterior surface of the at least one post. A tubular bushing is provided for attachment to the seat. The tubular bushing has an inside bore sized for receiving the at least one post and the inside bore has at least one longitudinal rib therein to guide the post so as to facilitate ready insertion thereof during manufacturing processes and inwardly and outwardly movement during operational use. The tubular bushing has a head outside the seat. The head has a socket with an open outside end. A button subassembly is inserted into the open outside end of the socket. The button subassembly has an insertable end that inserts into the open outside end of the socket; an actuator portion located at an opposite end of the button subassembly from the insertable end, the actuator portion remaining outside the socket when the button subassembly is installed, the actuator portion being movable with respect to the head after the button subassembly is inserted into the socket; a central portion inserted into the socket through which the at least one post extends; a spring located proximate the insertable end; and a tongue adapted to cooperate with an associated retainer notch provided on the at least one post when the at least one post is moving inwardly or outwardly. The tongue is movable out of alignment with the associated retainer notch when the actuator portion is moved so that the head restraint pad may be moved with respect to the motor vehicle seat. The tubular bushing is mounted to the seat.

A further aspect of the invention provides a method of attaching a head restraint assembly having a head restraint pad to a seat back. The method comprises connecting at least one post to the head restraint pad for supporting the head restraint pad and to permit the pad to be moved inwardly and outwardly in relation to the seat back. The at least one post has at least one retainer notch on the exterior surface of the at least one post. A tubular bushing is provided that is mountable to the seat and has an inside bore sized for receiving the at least one post. The tubular bushing has a head outside the seat. The head has a socket with an open outside end. A button subassembly is inserted into the open outside end of the socket, the button subassembly has an insertable end that inserts into the open outside end socket; an actuator portion located at the opposite end of the button subassembly from the insertable end, the actuator portion remaining outside of the socket when the button subassembly is installed, the actuator portion being movable with respect to the head after the button subassembly is inserted into the socket; a central portion inserted into the socket through which the at least one post extends; a spring located proximate the insertable end; and a tongue adapted to cooperate with an associated retainer notch provided on the at least one post when the at least one post is moving inwardly or outwardly. The tongue is movable out of alignment with the associated retainer notch when the actuator portion is moved so that the head restraint pad may be moved with respect to the motor vehicle seat. One of the socket or the button subassembly has a flange and the other of the socket or the button subassembly has a groove sized to receive the flange. The tubular bushing is mounted to the seat.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a cross-sectional view of the tubular bushing showing longitudinal ribs taken along line 6—6 of FIG. 4;

FIG. 7 is a plan view of the button subassembly of the present invention having a molded over spring;

FIG. 8 is a perspective view of the button subassembly of the present invention having an insert molded spring; and FIG. 9 is a perspective view of the button subassembly showing grooves and flanges on the insert and socket.

DETAILED DESCRIPTION OF THE PREFERRED EMBODIMENTS

Figure 1:
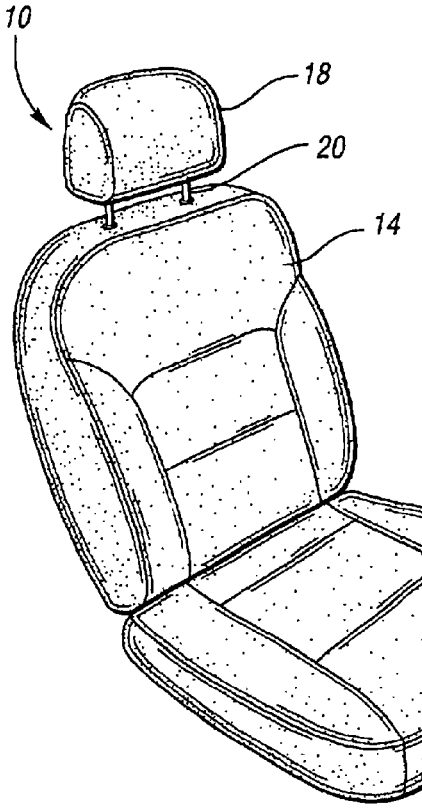
FIG. 1 is a perspective view of a motor vehicle seat of the type having a separate adjustable head restraint assembly.

Referring now to FIG. 1, there is shown a perspective view of a motor vehicle seat 10 having a bottom cushion 12 and a seat back 14. A head restraint assembly 16 is carried by the seat back 14 and has a pad 18 and a pair of downwardly extending mounting posts 20.

FIGS. 2 through 9 illustrate the head restraint assembly 16. The head restraint assembly 16 is provided to enable the pad 18 to be moved inwardly and outwardly in relation to the motor vehicle seat 10, and includes at least one tubular bushing 22, preferably made of plastic, mounted to the seat back 14. Preferably, one tubular bushing 22 is provided for each post 20. Each tubular bushing 22 has an inside bore 24 larger than the diameter of the post 20 for receiving the post 20. The bushing 22 further includes a head 26 formed at the upper end thereof which engages the outside of the seat back 14 when mounted to the seat 10. Preferably the seat back 14 includes a frame member 28 having an opening 30 larger than the tubular bushing 22 for receiving at least a portion of the tubular bushing 22.

Figure 3:
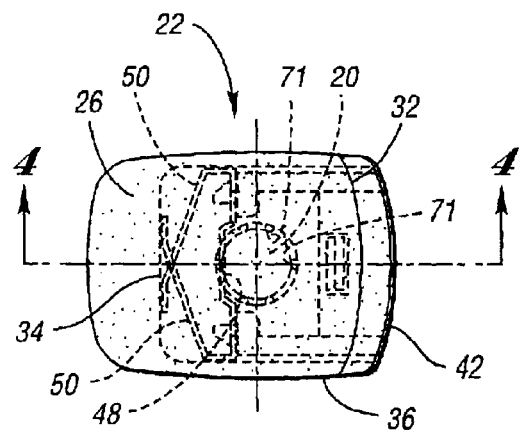
FIG. 3 is a top plan view of the head restraint assembly.
Figure 2:
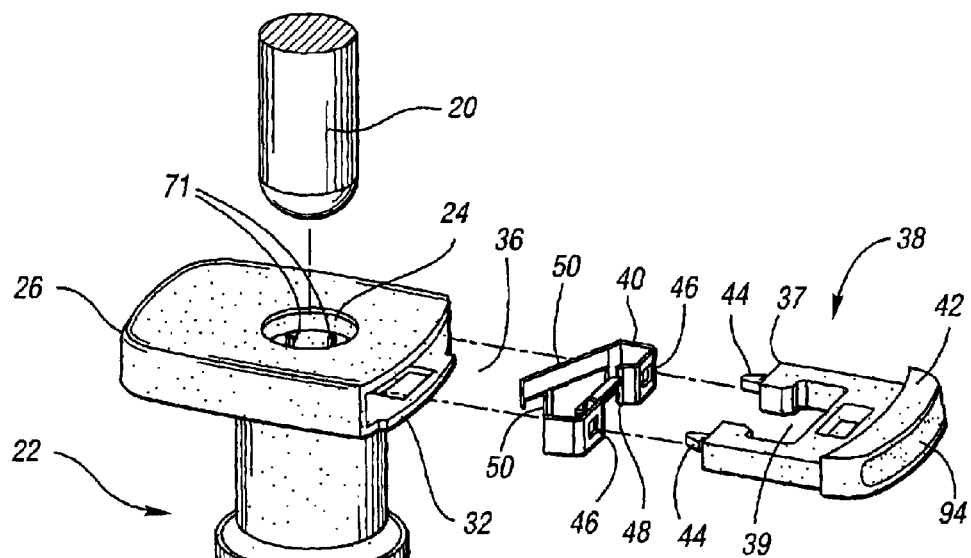
FIG. 2 is an exploded view of the head restraint assembly according to the present invention.
Figure 2:
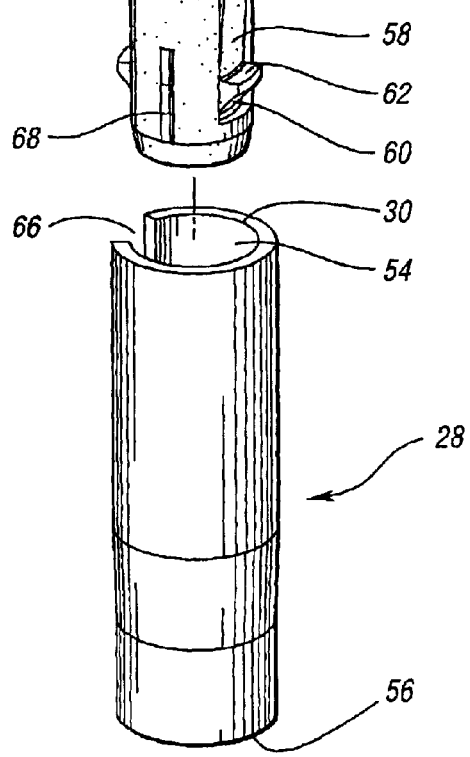

As illustrated in FIGS. 2 and 3, the head 26 has a socket 32 exposed to the bore 24 at a first end 34, and outwardly accessible at a second end 36. A button subassembly 38 having an insertable end 37 is insertable into socket 32 through the accessible second end 36 and includes a spring 40 located on one side of the bore 24 proximate the insertable end 37, and an actuator portion 42 located on the opposite end of the button subassembly from the insertable end and exposed at the accessible second end 36 of the head 26. The button subassembly has a central portion 39 through which the post 20 extends therethrough. In the preferred embodiment, the actuator portion 42 is provided with at least one protrusion 44 insertable into at least one aperture 46 formed on the spring 40, thereby removably connecting spring 40 and actuator 42 together. Additionally, the button subassembly 38 is configured to conform to the head 26 at the accessible second end 36 in the illustrated arrangement so that a flush engagement results when the actuator portion 42 is moved with respect to the head 26.

Further, in the preferred arrangement, the spring 40 is provided with a tongue or saddle portion 48 and legs 50. Upon insertion of the button subassembly 38, the spring 40 is positioned on one side of the bore 24 with legs 50 contacting the first end 34 of the socket 32, and actuator 42 positioned on the opposite side of bore 24 exposed at the accessible second end 36 of socket 32.

Preferably, the spring 40 is made out of a spring steel. However, one skilled in the art could manufacture the spring out of other materials such as other metals or polymers.

Figure 4:
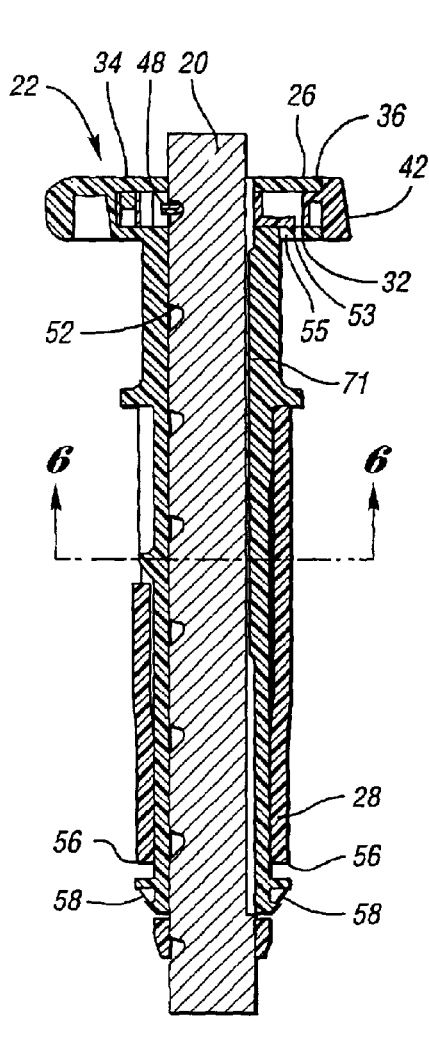
FIG. 4 is a cross-sectional view of the head restraint assembly taken along line 4—4 of FIG. 3.

The operation of button subassembly 38 may be understood upon reference to FIGS. 3 and 4. The post 20 is formed with at least one retainer notch 52 on its exterior surface. When more than one retainer notch 52 is provided, they are preferably aligned on one side of post 20. The tongue or saddle portion 48 is biased into alignment with the associated notch 52 provided along post 20 when post 20 is moving longitudinally.

The head restraint pad 18 may be moved inwardly or outwardly with respect to the seat 10 by moving actuator 42 into the socket 32 with the push of a finger, in turn compressing the legs 50 of the spring 40 and moving the tongue or saddle portion 48 out of alignment with the associated notch 52. The pad 18 can then be moved inwardly and outwardly within the bore 24 until the desired height is reached. The actuator 42 is released and the tongue or saddle portion 48 is again in alignment with a different notch 52.

In the preferred arrangement, it is desirable to retain the button subassembly 38 within the socket 32 while permitting the actuator 42 to be moved radially with respect to the head 26. This is accomplished by providing a locking rib tab 53 formed on the actuator 42 and a longitudinal slot 55 formed on the head 26 at the accessible second end 36. The locking rib 53 is movable within the slot 55 thereby limiting the transverse movement of actuator 42 so that button subassembly 38 is not unintentionally removed from the socket 32. Alternatively, the locking rib 53 may be formed on the head 26 and the slot 52 may be formed on the actuator 42, accomplishing the same result.

Figure 5:
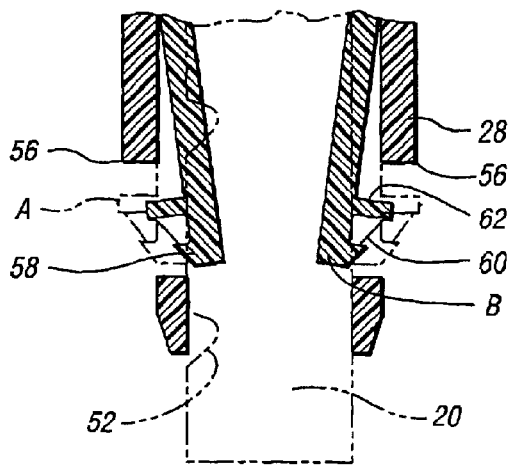
FIG. 5 is an enlarged cross-sectional view of part of FIG. 4, showing movement of the latch member between a latched and unlatched position.

In order to secure the bushing 22 into the seat back 12, the frame 28 is provided with a bore 54 extending from opening 30 and terminating at a length shorter than the length of the tubular bushing 22 to define a keeper 56. The tubular bushing 22 further defines a latch member 58 movable between a latched position A and an unlatched position B as shown in FIG. 5. The latch 58 includes a ramp surface 60 and a radial shoulder 62. Upon assembly, when the bushing 22 is inserted into the frame bore 54, the ramp surface 60 engages the frame bore 54 until radial shoulder 62 abuts the keeper 56. Next, the post 20 is inserted into the bore 24 thereby locking the latch 58 into latched position A and thereby anchoring bushing 22 into seat frame 28.

In use, the bushing 22 may be removed from the seat frame 28 by first removing the post 20 from the bore 24 causing the latch 58 to collapse into the unlatched position B as shown in FIG. 5. This allows the bushing 22 to be removed from the seat frame 28 if so desired.

In order to assure that bushing 22 is inserted into frame bore 54 in the same orientation upon repeated insertion, an orientation locator projection 64 is formed on the tubular bushing 22. The locator projection 64 is insertable into a slot portion 66 provided on the frame bore 54. Additionally, in order to assure that the bushing 22 is snugly fit into the frame bore 54, at least one rib 68 may be provided on tubular bushing 22 for localized, yet circumferentially distributed frictional engagement with the seat frame bore.

The bushing 22 preferably comprises a plurality of longitudinal ribs 71 within bore 24 to facilitate ready insertion thereof during manufacturing processes and inwardly and outwardly movement during operational use as shown, for example, in FIGS. 2, 3, 4 and 6. The number and spacing of the ribs 71 depends on several factors including the length and curvature of the post 20. Without the ribs 71, the post 20 would occasionally bind or rattle within the bore 24 due to manufacturing tolerances. With the ribs 71, the bore 24 is made slightly larger than the post 20 and the ribs 71 contact the mounting post to equalize and maintain efforts between the bushing 22 and the mounting post.

Referring now to FIG. 7, a second embodiment of the button subassembly 38 is shown. In this embodiment, the spring 40 is molded to the actuator 42 during the molding process. A plastic bridge 41 encapsulates the spring 40 about the tongue or saddle portion 48. This prevents any metal-to-metal contact between the spring 40 and post 20, thereby decreasing noise and rattle. In this embodiment, the plastic ridge 41 may be the tongue that cooperates with the notch 52.

Referring now to FIG. 8, a third embodiment of the button subassembly 38 is shown. In this embodiment, the spring 40 is a simple wire molded to the actuator 42 during the molding process. The spring 40 comprises a tongue or saddle portion 48 and legs 50. The tongue or saddle portion 48 may be exposed or encapsulated with plastic to prevent metal to metal plastic and cooperate with the notch 52. Further, as discussed above, the spring 40 may be manufactured out of a polymer to prevent metal to metal contact between the post 20 and the spring.

Due to manufacturing tolerances, the actuator 42 occasionally rattles in socket 32. Additionally, the actuators 42 may be inserted into the socket 32 upside down. In an effort to improve the performance and manufacture of the product, a flange 47 may be added to either the socket 32 or the actuator 42 to facilitate the ready movement of the button subassembly in the socket. Preferably, flanges 47 and grooves 49 added to the socket 32 and the actuator 42 as shown in FIG. 9. In the illustrated embodiment, grooves 49 are shown on the bottom surface 80 of the socket. Corresponding flanges 47 are shown on the bottom surface 82 of the actuator which align with the grooves 49. The flanges 47 and grooves 49 prevent the actuator from being inserted upside down. Additionally, the sidewalls 84 of the socket 32 are angled and the sidewalls 86 of the actuator are correspondingly angled so that the bottom surfaces 80, 82 are wider than the upper surfaces 88, 90 to further minimize the chance that the actuator is inserted upside down. Alternatively, the flanges may be in the socket 32 and the grooves on the actuator. Further, the flanges and grooves may be located on the top, side or bottom walls.

In order to improve the grip of the actuator, protrusions 92 may be added to the actuator 42, as shown in FIG. 9. Similarly, a depression 94 may be added to the actuator 42 to improve the grip on the actuator as shown in FIG. 2.

As shown in FIG. 9, the socket 32 has a bottom surface 80 and the actuator has a bottom surface 82. Preferably, the bottom surface 82 of the actuator is approximately in the same plane as the bottom surface 80 of the socket to prevent material from getting pinched between the actuator and the socket when the actuator is pushed in.

Thus, it is apparent that there has been provided, in accordance with the invention, an improved head restraint assembly for motor vehicle seats that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. A head restraint assembly for enabling a head restraint pad to be moved with respect to a motor vehicle seat back, the assembly comprising:

at least one post connected to and supporting the head restraint pad to permit the pad to be moved inwardly and outwardly in relation to the seat back, the at least one post having at least one retainer notch on the exterior surface of the at least one post;

a tubular bushing mounted at least partially within the seat back and having an inside bore sized for receiving the at least one post, the inside bore having at least one longitudinal rib therein to guide the post so as to facilitate ready insertion thereof during manufacturing processes and inward and outward movement during operational use, the tubular bushing having a head outside the seat, the head having a socket with an open outside end; and a button subassembly insertable into the open outside end of the socket, the button subassembly having an insertable end that inserts into the open outside end of the socket;

an actuator portion located at the opposite end of the button subassembly from the insertable end, the actuator portion remaining outside the socket when the button subassembly is installed, the actuator portion being movable with respect to the head after the button subassembly is inserted into the socket;

a central portion inserted into the socket through which the at least one post extends;

a spring having a pair of crossing arms located proximate the insertable end; and a tongue comprising a portion of the sprint that is integrally molded into and partially encapsulated by the insertable end of the button subassembly, thereby eliminating metal-to-metal contact between the spring and the at least one post and avoiding noise that would result therefrom, the tongue being adapted to cooperate with a retainer notch provided on the at least one post when the at least one post is moving inwardly or outwardly, the tongue being movable out of alignment with an associated retainer notch when the actuator portion is moved so that the head restraint pad may be moved with respect to the motor vehicle seat back.

2. The head restraint assembly of claim 1 wherein one of the socket or the button subassembly has a flange to facilitate ready movement of the button subassembly in the socket.

3. The head restraint assembly of claim 1 wherein one of the socket or the button subassembly has a flange and the other of the socket or the button subassembly has a groove sized to receive the flange to facilitate ready movement of the button subassembly in the socket.

4. The head restraint assembly of claim 1 wherein the head has a bottom surface having an opening therein and the button subassembly has a flexible locking rib wherein the locking rib extends through the opening on the bottom surface of the head to selectively lock the button subassembly in the head.

5. The head restraint assembly of claim 1 wherein the button subassembly has a bottom surface having an opening therein and the head has a flexible locking rib wherein the locking rib extends through the opening on the bottom surface of the button subassembly to selectively lock the button subassembly in the head.

6. The head restraint assembly of claim 1 wherein the inside bore has a number of ribs between five and seven.

7. The head restraint assembly of claim 1 wherein the actuator portion has at least one protrusion to facilitate digital manipulation without slippage.

8. The head restraint assembly of claim 1 wherein the actuator portion has at least one depression to facilitate digital manipulation without slippage.

9. The head restraint assembly of claim 1 wherein the spring comprises a polymer.

10. A method of attaching a head restraint assembly having a head restraint pad to a seat back, the method comprising:

attaching at least one post to the head restraint pad for supporting the head restraint pad and to permit the pad to be moved inwardly and outwardly in relation to the seat back, the at least one post having at least one retainer notch on the exterior surface of the at least one post;

providing tubular bushing mounted at least partially within the seat back and having an inside bore sized for receiving the at least one post, the inside bore having at least one longitudinal rib therein to guide the post so as to facilitate ready insertion thereof during manufacturing processes and inward and outward movement during operational use, the tubular bushing having a head outside the seat, the head having a socket with an open outside end;

inserting a button subassembly into the open outside end of the socket, the button subassembly having an insertable end that inserts into the open outside end of the socket;

an actuator portion located at the opposite end of the button subassembly from the insertable end, the actuator portion remaining outside the socket when the button subassembly is installed, the actuator portion being movable with respect to the head after the button subassembly is inserted into the socket;

a central portion inserted into the socket through which the at least one post extends;

a spring located proximate the insertable end; and a tongue comprising a portion of the spring that is integrally molded into and partially encapsulated by the insertable end of the button subassembly, thereby eliminating metal-to-metal contact between the spring and the at least one post and avoiding noise that would result therefrom, the tongue being adapted to cooperate with the retainer notch provided on the at least one post when the at least one post is moving inwardly or outwardly, the tongue being movable out of alignment with the associated retainer notch when the actuator portion is moved so that the head restraint pad may be moved with respect to the motor vehicle seat; and mounting the tubular bushing to the seat.

11. The head restraint assembly of claim 1, wherein the spring has a rounded cross-section.

12. The head restraint assembly of claim 6, wherein the ribs are unequally spaced around the inside bore.

* * * * *

UNITED STATES PATENT AND TRADEMARK OFFICE
CERTIFICATE OF CORRECTION

PATENT NO. : 6,802,565 B2
DATED : October 12, 2004
INVENTOR(S) : Troy Allen Isaacson It is certified that error appears in the above-identified patent and that said Letters Patent is hereby corrected as shown below:

Column 7,
Line 64, delete "sprint" and insert -- spring --.

Signed and Sealed this

Eighth Day of February, 2005

JON W. DUDAS
*Director of the United States Patent and Trademark Office*